(12) United States Patent
Lohmar et al.

(10) Patent No.: US 9,277,372 B2
(45) Date of Patent: Mar. 1, 2016

(54) FILE SCHEDULING IN BM-SC

(71) Applicant: Telefonaktiebolaget L M Ericsson (publ), Stockholm (SE)

(72) Inventors: Thorsten Lohmar, Aachen (DE); Ibtissam El Khayat, Glons (BE); Ryan Fitzgerald, Athlone (IE); Michael John Slssingar, Skärholmen (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/259,570

(22) Filed: Apr. 23, 2014

(65) Prior Publication Data

US 2014/0325580 A1    Oct. 30, 2014

(30) Foreign Application Priority Data

Apr. 24, 2013    (EP) .................................... 13002148

(51) Int. Cl.
| | |
|---|---|
| *H04N 7/173* | (2011.01) |
| *H04W 4/06* | (2009.01) |
| *H04W 72/00* | (2009.01) |
| *H04W 4/02* | (2009.01) |

(52) U.S. Cl.
CPC .............. *H04W 4/06* (2013.01); *H04W 72/005* (2013.01); *H04W 4/02* (2013.01)

(58) Field of Classification Search
CPC ............ H04N 7/17318; H04N 21/235; H04N 21/262; H04H 60/06; H04L 29/08963
See application file for complete search history.

(56) References Cited

U.S. PATENT DOCUMENTS

| | | | | |
|---|---|---|---|---|
| 2005/0237972 | A1* | 10/2005 | Van Dervelde et al. | 370/329 |
| 2006/0146745 | A1* | 7/2006 | Cai et al. | 370/328 |
| 2011/0135300 | A1* | 6/2011 | Oyane et al. | 398/25 |
| 2011/0268018 | A1* | 11/2011 | Wang et al. | 370/328 |

FOREIGN PATENT DOCUMENTS

EP    2180651 A1 *    4/2010

OTHER PUBLICATIONS

Third Generation Partnership Project, "3GPP TS 26.346 V11.3.0 (Dec. 2012)," 3rd Generation Partnership Project; Technical Specification Group Services and System Aspects; Multimedia Broadcast/Multicast Service (MBMS); Protocols and codecs (Release 11). Dec. 2012. pp. 1-168.*

Paila, T., et al., "Flute—File Delivery over Unidirectional Transport," RFC 3926. Network Working Group; Category: Experimental. The Internet Society. Oct. 2004. pp. 1-35.

* cited by examiner

*Primary Examiner* — Nathan Flynn
*Assistant Examiner* — Alfonso Castro
(74) *Attorney, Agent, or Firm* — Murphy, Bilak & Homiller, PLLC (57) ABSTRACT

The present disclosure relates to a technique for scheduling a point-to-multipoint (PTM) transmission of content data, provided by a content provider node, to a plurality of mobile terminals in a PTM-enabled network. A method embodiment comprises the steps of: receiving, by a PTM transmission control node, delivery schedule information from the content provider node, the delivery schedule information indicating a delivery time at which at least a portion of the content data is to be receivable by the plurality of mobile terminals; and determining, by the PTM transmission control node, a transmission start time for starting the transmission of the content data to one or more of the plurality of mobile terminals located in a service area of the PTM transmission control node, wherein the transmission start time is determined based on the delivery time and one or more system delay parameters.

16 Claims, 6 Drawing Sheets

FILE SCHEDULING IN BM-SC

RELATED APPLICATIONS

This application claims priority under 35 U.S.C. §119 from European Patent Application No. 13002148.8 filed on 24 Apr. 2013, the content of said application incorporated herein by reference in its entirety.

TECHNICAL FIELD

The present invention relates to the field of data scheduling. More specifically, the present invention relates to a technique for scheduling a point-to-multipoint (PTM) transmission of content data, provided by a content provider node, to a plurality of mobile terminals in a PTM-enabled network.

BACKGROUND

PTM transmissions allow communication which is accomplished via a one-to-many connection, providing multiple paths from a single location to multiple locations. Point-to-multipoint is often abbreviated not only as PTM, but also as P2MP, PTMP, or PMP. In 3GPP, one example of PTM transmission is the so called Multimedia Broadcast Multicast Service (MBMS). In 3GPP2, MBMS is called BroadCast and MultiCast Service (BCMCS).

The MBMS feature is split into the MBMS bearer service and the MBMS user service. The MBMS bearer service provides delivery for two services: broadcast and multicast (MBMS allows the distribution of files over broadcast/multicast bearers and introduces shared radio broadcast/multicast bearers). The broadcast service can be received by any subscriber located in the area where the service is offered and multicast services can only be received by users who have subscribed to the service and have joined the multicast group associated with the service. According to MBMS, the unicast system for point-to-point (PTP) transmission is offloaded when multiple devices and users are interested in the reception of the file. That is, within the radio access network, MBMS integrates PTM bearers for broadcast/multicast in cells with a high number of group members with PTP bearers for unicast. In consequence, a service delivered over MBMS typically uses PTM transmission (broadcast/multicast transmission) within geographical areas (e.g., in cells) of high density of group members and PTP transmission within geographical areas (e.g., in cells) with a low number of group members. Both services broadcast and multicast are unidirectional, point-to-multipoint transmissions of multimedia data and can be applied to broadcast text, audio, picture, video usually from a Broadcast/Multicast Service Center (BMSC or BM-SC) to any user located within the designated service area. Thus, MBMS ensures delivery of applications such as mobile TV, radio broadcasting, file delivery and emergency alerts.

The MBMS user service is basically the MBMS service layer and offers a streaming and a download delivery method. The streaming delivery method is used for continuous transmissions such as Mobile TV services. The Real-time Transport Protocol (RTP) may be used for delivering the content data in the streaming delivery method. The download method is intended for "Download and Play" services. For delivering the content data in the download method, content data is normally transported using the File Delivery over Unidirectional Transport (FLUTE) protocol (RFC 3926). To increase the transmission reliability, an application layer Forward Error Correction (FEC) code may be used. In other words, the FLUTE protocol allows FEC protection of content files and it may use the Internet Engineering Task Force (IETF) FEC framework. Further, a file-repair service may be offered to complement the download delivery method.

In order to allow mobile terminals to save battery, the concept of session and file schedule has been introduced in MBMS. According to this concept, the mobile terminals which are interested in receiving content data are provided with a sufficiently precise schedule so that the mobile terminals only need to wake-up and tune-in at time of possible reception. Thus, a mobile terminal only wakes up when the service(s) of its interest is (are) transmitted, while it can sleep during the transmission of other services or when no service is transmitted. For example, session and scheduling may be implemented in MBMS in the distribution of software updates. Typically all devices of the same type (e.g. Galaxy S III, or iPhone®) are interested in the same software package. Another example would be pre-loading of YouTube clips. Here the interest is not device specific (all Android™ and iOS® devices can handle the YouTube clip), but more user-interest specific.

The intention of the file delivery schedule solution (TS 26.346, version 11.3.0) is to give mobile terminals a reception schedule at which the mobile terminals shall expect to receive the file. The intention is that the mobile terminals should only wake up during the described schedule to save battery. The more precise the schedule is, the more the battery drain is reduced.

SUMMARY

Accordingly, there is a need to provide a technique for precisely scheduling PTM transmissions of content data in a PTM-enabled network.

According to a first aspect, a method for providing delivery schedule information for scheduling a point-to-multipoint (PTM) transmission of content data, provided by a content provider node, to a plurality of mobile terminals in a PTM-enabled network is provided. The method comprises the steps of: specifying, by the content provider node, delivery schedule information indicating a delivery time at which at least a portion of the content data is to be receivable by the plurality of mobile terminals; and providing, by the content provider node, the delivery schedule information to at least one PTM transmission control node for determining a transmission start time for starting the transmission of the content data to one or more of the plurality of mobile terminals located in a service area of the at least one PTM transmission control node, wherein the transmission start time is determined based on the delivery time and one or more system delay parameters.

In accordance with a first possible implementation of the method according to the first aspect, the method may further comprise the step of providing, by the content provider node, the delivery schedule information to the plurality of mobile terminals. In accordance with a second possible implementation of the method according to the first aspect, which may be implemented independent from or in combination with the first possible implementation of the method according to the first aspect, the method may further comprise the step of providing, by the content provider node, the delivery schedule information to the at least one PTM transmission control node. According to the second possible implementation, the method may further comprise the step of forwarding, by the at least one PTM transmission control node, the delivery schedule information to the plurality of mobile terminals.

The step of determining the transmission start time may be performed by the at least one PTM transmission control node. The determination may be performed on the basis of the delivery schedule information received by the content provider node and the one or more system delay parameters. The determined transmission start time may be the time at which the at least one PTM transmission control node starts the transmission of the content data, e.g., to one or more radio access network nodes which themselves may transmit the content data to one or more of the plurality of mobile terminals.

According to a second aspect, a method for scheduling a point-to-multipoint, PTM, transmission of content data, provided by a content provider node, to a plurality of mobile terminals in a PTM-enabled network is provided. The method comprises the steps of: receiving, by a PTM transmission control node, delivery schedule information from the content provider node, the delivery schedule information indicating a delivery time at which at least a portion of the content data is to be receivable by the plurality of mobile terminals; and determining, by the PTM transmission control node, a transmission start time for starting the transmission of the content data to one or more of the plurality of mobile terminals located in a service area of the PTM transmission control node, wherein the transmission start time is determined based on the delivery time and one or more system delay parameters.

The method according to the second aspect may further comprise the step of transmitting, by the PTM transmission control node, the content data to the one or more mobile terminals or one or more radio access network nodes located in the service area of the PTM transmission control node at the determined transmission start time.

According to a third aspect, a method for scheduling a point-to-multipoint, PTM, transmission of content data, provided by a content provider node, to a plurality of mobile terminals in a PTM-enabled network is provided. The method comprises the steps of: specifying, by the content provider node, delivery schedule information indicating a delivery time at which at least a portion of the content data is to be receivable by the plurality of mobile terminals; providing, by the content provider node, the delivery schedule information to at least one PTM transmission control node; receiving, by the at least one PTM transmission control node, the delivery schedule information from the content provider node; and determining, by the at least one PTM transmission control node, a transmission start time for starting the transmission of the content data to one or more of the plurality of mobile terminals located in a service area of the at least one PTM transmission control node, wherein the transmission start time is determined based on the delivery time and one or more system delay parameters.

In accordance with all method aspects described herein, the term delivery schedule information may be construed to mean, without limitation, at least one of a session schedule and a file schedule. For example, the delivery schedule information may also be considered to mean a combined session and file schedule. In other words, the term delivery schedule information may mean, without being limited thereto, a session schedule, a file schedule, a session and file schedule, or any repeated (e.g, temporal sequences) or combined derived expressions of those terms.

Further, in accordance with all method aspects described herein, the PTM-enabled network may be any kind of communications network in which PTM transmissions may be provided. For example, the PTM-enabled network may be a 2G telecommunications network like a GSM network, a 3G telecommunications network like an UMTS network, a 4G telecommunications network like an LTE or LTE-a network or any future telecommunications network. In this context, the radio access network nodes may be configured as or comprise BTSs, NodeBs or eNodeBs and the mobile terminals may be configured as or comprise User Equipments (UEs) or other mobile terminal equipments. The PTM transmission may be configured as or based on MBMS or BCMCS, but is not limited thereto. In case of MBMS, the PTM transmission control node may be or comprise an BM-SC or an eBM-SC. The content provider node may also be referred to as (content) provisioning system, (content) provisioning node or merely as (content) control system/node.

The content data may be processed and/or forwarded by several network nodes or entities from its source, i.e. the content provider node, until it is finally receivable by the plurality of mobile terminals, e.g. when the content data is "on-air" (receivable on the radio interface between the radio access network nodes and the mobile terminals). In case of one PTM transmission control node or multiple PTM transmission control nodes, the content data may take different routes until it is finally receivable. In case of one PTM transmission control node, the different routes may result from the connection of the PTM transmission control node to different radio access network nodes or different radio access network node groups. In case of multiple PTM transmission control nodes, the different routes may result from the multiple PTM transmission control nodes being connected to the content provider node via different connections and/or to different radio access network nodes or different radio access network node groups. The different processing and/or forwarding nodes provided on the different routes may include, without limitation, one or more PTM transmission control nodes like eBM-SCs, one or more radio access network nodes like eNodeBs and further network nodes typically provided in the PTM-enabled network.

In accordance with all method aspects described herein, the one or more system delay parameters may comprise any delay caused by or associated with the processing and/or forwarding and/or transmission of the content data from the content provider node until the content data is receivable by the plurality of mobile terminals.

For example, the one or more system delay parameters may comprise at least one of: a transmission time offset, a Multicast CHannel (MCH) Scheduling Period (MSP) duration (which may also be referred to as MSP delay), a segment duration (which may also be referred to as segment duration delay) and a content connection delay. The transmission time offset may be or comprise a transmission delay of a packet of the content data from the PTM transmission control node (e.g., BM-SC in case of MBMS) to one or more radio access network nodes (e.g., one or more eNodeBs in case of LTE) responsible for transmission of the content data to on or more of the plurality of mobile terminals on the radio interface. The MSP duration may be or comprise a processing duration of the content data within one MSP (the processing duration of the radio access network node (e.g., eNodeB) for processing one or more packets of the content data to be transmitted). For determining the MSP duration, the radio parameters used in the MSP may be considered. The processing duration (which may also be referred to as processing delay) could be added in the PTM transmission control node (e.g., the BM-SC). For example, the BM-SC of a first Vendor may need to start the transmission process earlier than others. The segment duration may be relevant if segmented representations are used for the content data. The segment duration may be dependent on the type of the content data. The segment duration may be or comprise a duration of the respective segments of the content data (if the content data is segmented). The content connection delay may be or comprise any delay arising from the content data source (content provider node) to the PTM transmission control node.

However, the present invention is not limited to these specific examples, but further delay parameters occurring within the MBMS system may be considered by the at least one PTM transmission control node. For example, the one or more system delay parameters may comprise, alternatively to, additionally to or in generalization of the aforementioned examples, at least one of: information indicating a transmission delay for transmitting the content data between one or more network nodes, information indicating the amount of the content data to be transmitted, information indicating the target bitrate for the transmission of the content data, and information indicating a processing delay for processing the content data at one or more network nodes.

Independent of the exact implementation of the system delay parameters, the at least one PTM transmission control node may be configured to consider the one or more system delay parameters in addition to the delivery time in order to determine the respective transmission start time for initiating or starting the transmission of the content data to the radio access network nodes. The one or more system delay parameters may also be regarded as information indicating the MBMS system's intrinsic delay(s). Each of the at least one PTM transmission control node may consider different system delay parameters and may therefore determine different transmission start times for initiating transmission of the content data.

Different implementations are conceivable for scheduling the transmission of the content data by the at least one PTM transmission control node. According to a first possible implementation, each of the at least one PTM transmission control node(s) may determine one single transmission time at which the content data is transmitted to all radio access network nodes or radio access network node groups in the service area of the respective PTM transmission control node. This single transmission time may be determined by considering the longest end-to-end delay between each of the at least one PTM transmission control node and the radio access network nodes or radio access network node groups. According to a second possible implementation, each of the at least one PTM transmission control node(s) determines separate transmission times for each of the radio access network nodes or radio access network node groups in the service area of the respective PTM transmission control node. Each of these separate transmission times may be associated with one of the radio access network nodes or radio access network node groups and may indicate the time at which the content data is transmitted to the respective one of the radio access network nodes or radio access network node groups. These separate transmission times may be determined by considering the respective end-to-end delays between each of the at least one PTM transmission control node and each of the radio access network nodes or radio access network node groups. The separate transmission times may be different from each other. A radio access network node group may comprise multiple radio access network nodes which serve a certain area and which transmit the content data in Single Frequency Network (SFN) operation mode. In accordance with the second possible implementation, the at least one PTM transmission control node may be configured to determine the transmission time separately for each radio access network node or radio access network node group in its service area. In case of multiple PTM transmission control nodes, each of the multiple PTM transmission control nodes may be configured to determine the transmission time separately for each radio access network node or radio access network node group in its service area.

The transmission start time may be determined such that at least the portion of the content data is receivable by the one or more mobile terminals at the delivery time. The transmission delay for transmitting the content data between one or more network nodes may correspond to or may be larger than the duration for transmitting at least the portion of the content data from the at least one PTM transmission control node to the most remote radio access network node of a plurality of radio access network nodes in the service area of the at least one PTM transmission control node. In this way, it may be ensured that even the mobile terminals supplied by the most remote radio access network node receive the content data at the scheduled delivery time, as even the most remote radio access network node has received at least the portion of the content data to be transmitted well before the scheduled delivery time. Further, it may be ensured in this way that all of the plurality of mobile terminals receive the content data at least almost simultaneously at the scheduled delivery time, as also the most remote radio access network node can transmit the content data sufficiently early.

The delivery time may be the time at which the first packet of the content data is to be receivable by the plurality of mobile terminals. Alternatively or additionally, the delivery time may be the time at which a certain amount of the content data is to be receivable by the plurality of mobile terminals. Alternatively or additionally, the delivery time may be the time at which a certain amount of the content data and additional Forward Error Control (FEC) data is to be receivable by the plurality of mobile terminals.

It is conceivable that the content data may be arranged in a data file. In this case, the delivery time may be the time at which the transmission of the data file over a radio interface to the plurality of mobile terminals is to be completed. Alternatively or additionally, the delivery time may be the time at which the transmission of the data file together with additional FEC data over the radio interface to the plurality of mobile terminals is to be completed.

In accordance with a variant of at least one of the first, second and third aspect, the delivery schedule information may indicate a delivery start time and a delivery stop time during which the content data is to be receivable by the plurality of mobile terminals. In other words, according to this variant, the delivery schedule information may indicate a period of time during which the content data is to be receivable, rather than a point of time at which a portion, e.g., the first packet, of the content data is to be receivable. For example, the delivery schedule information may indicate a period of time during which the transmission of the file is to be completed.

According to a fourth aspect, a computer program is provided, the computer program comprising program code portions for performing the steps of any one of the method aspects described herein, when the computer program is run on one or more computing devices. The computer program may be stored on a computer readable medium, which may be essentially any type of recording medium used for non-transitory storage. Non-limiting examples include EEPROM, FLASH, CD-ROM, hard disk, Solid State Disk, etc.

According to a fifth aspect, a content provider node for providing delivery schedule information for scheduling a point-to-multipoint, PTM, transmission of content data, provided by the content provider node, to a plurality of mobile terminals in a PTM-enabled network is provided. The content provider node comprises: a specifying component for specifying delivery schedule information indicating a delivery time at which at least a portion of the content data is to be receivable by the plurality of mobile terminals; and a transmission component for providing the delivery schedule information to at least one PTM transmission control node for determining a transmission start time for starting the transmission of the content data to one or more of the plurality of mobile terminals located in a service area of the at least one PTM transmission control node, wherein the transmission start time is determined based on the delivery time and one or more system delay parameters.

The content provider node may be configured to perform any one of the method aspects as described herein with reference to the method according to the first aspect. For this purpose, the content provider may comprise suitable components or units for performing said method aspects.

According to a sixth aspect, a point-to-multipoint, PTM, transmission control node for scheduling a PTM transmission of content data, provided by a content provider node, to a plurality of mobile terminals in a PTM-enabled network is provided. The PTM transmission control node comprises: a receiving component for receiving delivery schedule information from the content provider node, the delivery schedule information indicating a delivery time at which at least a portion of the content data is to be receivable by the plurality of mobile terminals; and a determining component for determining a transmission start time for starting the transmission of the content data to one or more of the plurality of mobile terminals located in a service area of the PTM transmission control node, wherein the transmission start time is determined based on the delivery time and one or more system delay parameters.

The PTM transmission control node may be configured to perform any one of the method aspects as described herein with reference to the method according to the second aspect. For this purpose, the PTM transmission control node may comprise suitable components or units for performing said method aspects.

According to a seventh aspect, a system for scheduling point-to-multipoint, PTM, transmission of content data, provided by the content provider node according to the fifth aspect as described herein, to a plurality of mobile terminals in a PTM-enabled network is provided. The system comprises: the content provider node according to the fifth aspect as described herein, and at least one PTM transmission control node according to the sixth aspect as described herein.

The system may comprise a plurality of PTM transmission control nodes according to the sixth aspect as described herein. The determining component of each of the plurality of PTM transmission control nodes may be configured to individually determine a transmission start time for starting the transmission of the content data to one or more of the plurality of mobile terminals located in a service area of the respective PTM transmission control node.

BRIEF DESCRIPTION OF THE DRAWINGS

In the following, the invention will further be described with reference to exemplary embodiments illustrated in the figures, in which.

DETAILED DESCRIPTION

In the following description, for purposes of explanation and not limitation, specific details are set forth, such as specific network topologies including particular network nodes, in order to provide a thorough understanding of the present invention. It will be apparent to one skilled in the art that the present invention may be practiced in other embodiments that depart from these specific details. For example, the skilled artisan will appreciate that the present invention may be practiced with multicast/broadcast mechanisms different from the 3GPP MBMS standard discussed below to illustrate the present invention. Also, the invention may be practiced in any network to which mobile or stationary users may attach. For example, the invention is applicable to, besides cellular networks, WLAN, Bluetooth, DVB or similar wireless networks, but also to wireline networks such as, for example, the Intranet of a company with some or many separated subsidiaries or the Internet.

Those skilled in the art will further appreciate that functions explained herein below may be implemented using individual hardware circuitry, which may be fixed circuitry, programmed circuitry, or a mix of fixed and programmed circuitry. In one example, the functions set forth herein are at least partly implemented in one or more processing circuits that are specially adapted to operate according to the teachings herein based on the execution of computer program instructions comprising one or more computer programs that are stored in computer readable media, for access by the processing circuit(s). Example circuitry includes a programmed microprocessor or a general purpose computer, an Application Specific Integrated Circuit (ASIC) and/or using one or more Digital Signal Processors (DSPs). It will be broadly appreciated, then, that the various method(s) set forth herein, e.g., as carried out by a content provider node and a PTM transmission control node, may be embodied in a computer processor and a memory coupled to a processor, wherein the memory is encoded with one or more programs to perform the methods disclosed herein when executed by the processor.

Figure 1:
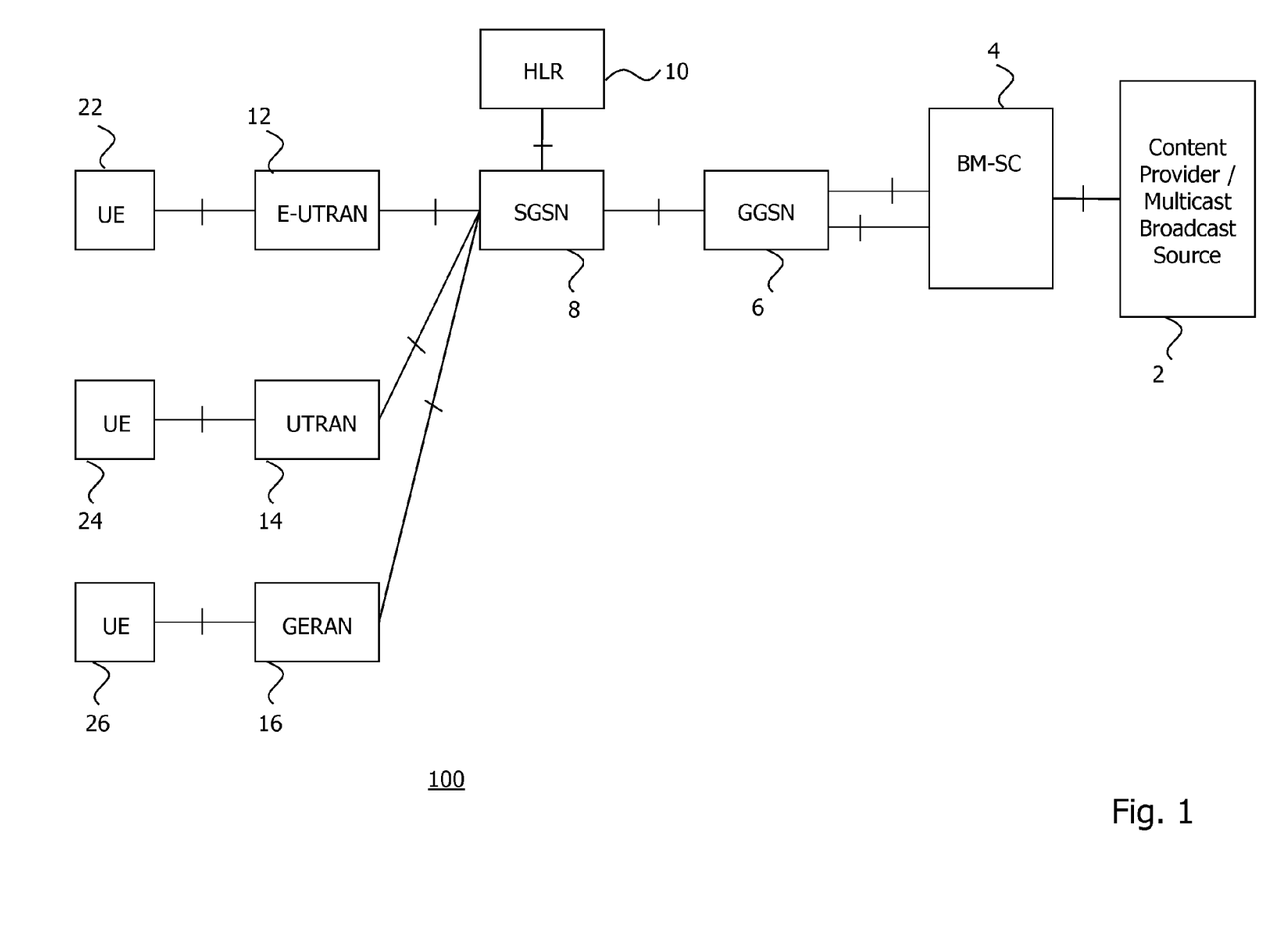
FIG. 1 is a schematic illustration of a general architecture of an MBMS system.

A possible architecture of an MBMS system is schematically depicted in FIG. 1. The MBMS system comprises a content provider 2 (which may also be referred to as Multicast Broadcast Source) providing content data and a BM-SC 4. Based on the Packet Core domain the MBMS service architecture is compatible with 2G Global System for Mobile Communications (GSM) or 3G Universal Mobile Telecommunications System (UMTS) Packet Core nodes like the SGSN 8 and GGSN 6. The BM-SC 4 serves as an entry point for content delivery services that use MBMS. The BM-SC 4, inter alia, sets up and controls MBMS transport bearers towards the mobile core network and can schedule and deliver MBMS transmissions.

The User Equipments (UEs) 22, 24, 26 schematically shown in FIG. 1 can save battery by following information from a Schedule Fragment provided by the content provider 2. The Schedule Fragment (or MBMS Schedule Fragment) contains session and file schedule information. In order to save as much energy as possible, the data shall be on-air according to the defined schedule. If the content provider 2 would only define the start of the sending process on the BM-SC side by triggering the BM-SC 4, the BM-SC 4 would start the sending process immediately after being triggered.

Each MBMS system has a certain end-to-end delay. This is mostly due to the operation in Single Frequency Network (SFN) operation mode. The content provider 2 needs to know the end-to-end delay of the MBMS system in order to provide the correct schedule description to the UEs 22, 24, 26 accessing the MBMS system. Also, the content provider 2 needs to trigger the sending of the file or content data in general such time in advance that it is broadcast according to the schedule on the radio. Each involved Radio Access Network (RAN) node (e.g., Base Transceiver Station (BTS) in terms of GSM, NodeB in terms of UMTS or eNodeB in terms of LTE) shall have the needed data so that all RAN nodes can broadcast exactly the same portion of data over the radio. However, the end-to-end delay depends on bearer configuration and also on implementation aspects.

Typically, a RAN node (e.g., an eNodeB) has a buffer corresponding to one Multicast CHannel (MCH) Scheduling Period (MSP), in which it inserts the received packets before transmission to the UEs 22, 24, 26. The length of the MSP may be one time or multiple times the synchronization sequence length for MBMS services in the MCH. The Radio Parameters used in the MSP, inter alia, determine the end-to-end delay. All RAN nodes (e.g., all eNodeBs) must have all data for the MSP in order to compile the corresponding MCH Scheduling Information (MSI) element. The MSI describes the allocation of data and MBMS bearers within the MSP. For synchronizing the transmission from multiple RAN nodes connected to the same BM-SC 4 (or e-BM-SC in terms of LTE), the so-called SYNC protocol layer is defined on the transport network layer to support content synchronization. It carries additional information that enables RAN nodes (e.g., e-NodeBs) to identify the timing for radio frame transmission. For example, every MBMS (or eMBMS in terms of LTE) service uses its own SYNC entity. In LTE, the SYNC protocol operates between the eBM-SC and the eNodeBs. As a result of synchronization, it is ensured that the same content is sent over the air to all UEs 22, 24, 26. The eBM-SC should indicate the timestamp of the transmission of the first packet of a burst of data (block of packets) by all eNodeBs and the interval between the radio transmissions of the subsequent packets of the burst as well.

However, the end-to-end delay from the BM-SC 4 until the data is finally on-air is influenced by multiple factors. For example, multi-vendor implementations result in different end-to-end delays. The needed processing time to create the MSI in the eNodeB is vendor specific. Also the processing time to partition the files to be transmitted according to the FLUTE protocol and to apply FEC overhead in the BM-SC 4 is vendor specific. It can be expected that BM-SCs and end-to-end systems from different vendors have a different minimal end-to-end delay. Processing delay in network nodes and in particular the buffering duration of SYNC PDUs in the eNodeB may also result in different end to end-to-end delays.

Consequence of the delay difference is that UEs 22, 24, 26 when located in different broadcast areas will see a file, injected into the corresponding serving BM-SC 4 at the same time, at different times. This becomes in particular an issue, when the content provider 2 informs the UEs 22, 24, 26 about the file delivery schedule (as allowed by TS 26.346) in advance. As stated above, the intention of the file delivery schedule solution (TS 26.346) is to give the UEs 22, 24, 26 a reception schedule at which the UEs 22, 24, 26 shall expect to receive the file. The intention is that the UEs 22, 24, 26 should only wake up during the described schedule to save battery. The more precise the schedule is, the more the battery drain is reduced.

In today's solutions, the service provisioning node like the content provider 2 of FIG. 1 can schedule MBMS or eMBMS (the term eMBMS is normally used in Long Term Evolution (LTE) or LTE-Advanced (LTE-A) networks) sessions, but cannot schedule the actual content. An eMBMS session is the time during which an eMBMS bearer is up and can be used for broadcasting data into the well-defined broadcast area.

Figure 2:
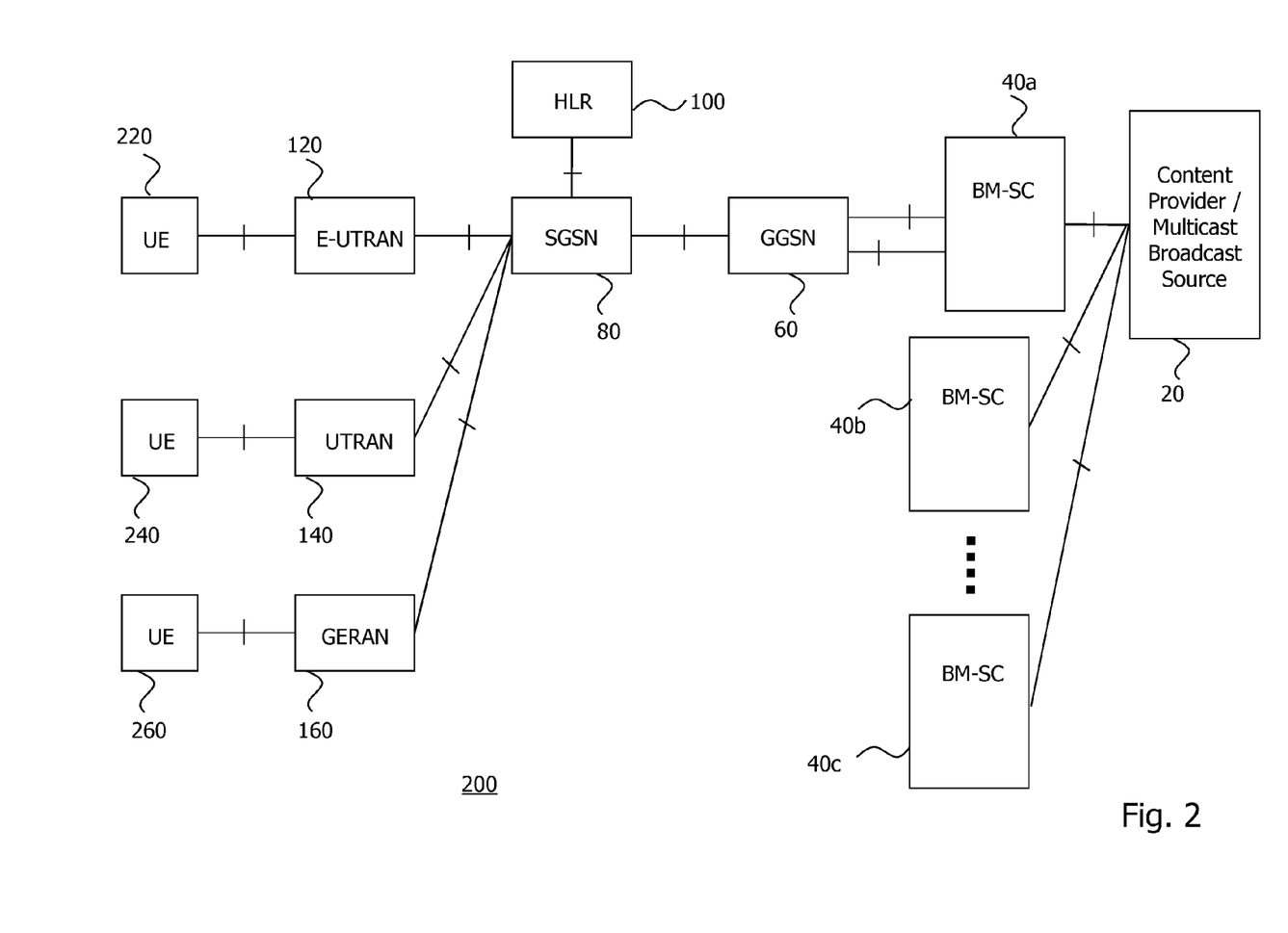
FIG. 2 is a schematic illustration of an architecture of an MBMS system according to an embodiment.

The MBMS system according to the embodiment of FIG. 2 comprises, by way of example, a content provisioning node (which may also be referred to as (content) control system/node or content provider node) which is in the following referred to, without limitation, as a Mobile Broadcast Manager (MBM) node 20. The MBM node 20 is configured to provide content data, e.g., multimedia content data, audio/video files or the like. Further, three BM-SCs 40a to 40c are shown as an example of PTM transmission control nodes to illustrate that the example of FIG. 2 may be practiced with any conceivable number of BM-SCs, e.g. with one single BM-SC or two or more BM-SCs. Just by way of example, the MBMS architecture of FIG. 2 shows three BM-SCs 40a to 40c to illustrate a plurality of BM-SCs. FIG. 2 further exemplarily shows a GGSN 60, an SGSN 80 and an HLR 100 to illustrate network nodes of a core network for connecting the BM-SC 40a to Radio Access Networks (RANs). Although not shown in FIG. 2, each of the further BM-SCs 40b, 40c may be connected in a similar manner to one or more RANs. Also purely by way of example, three different RANs, namely a GERAN 160, an UTRAN 140 and an e-UTRAN 120, are shown to illustrate that different kinds of RANs may be connected to the BM-SCs 40a to 40c. Each of the RANs is exemplarily connected to a User Equipment (UE) 220, 240, 260 via a radio interface. Just for sake of simplicity, only one UE is shown as being connected to each RAN, but any number of UEs may be wirelessly connected to the RANs via a radio interface, respectively. Although not shown in FIG. 2, each of the RANs may comprise one or more RAN nodes, e.g., the GERAN 160 may comprise one or more Base Transceiver Stations (BTSs), the UTRAN 140 may comprise one or more NodeBs, and the e-UTRAN 120 may comprise one or more eNodeBs.

The MBM node 20 is designed to provide services and sessions on one or more BM-SCs, e.g., as shown in FIG. 2, on multiple different BM-SCs 40a to 40c. Although only three BM-SCs 40a to 40c are shown, by way of example in FIG. 2, it is conceivable that the MBM node 20 provides services and sessions provisioning information to several, e.g., seven, independent BM-SC nodes.

Figure 3:
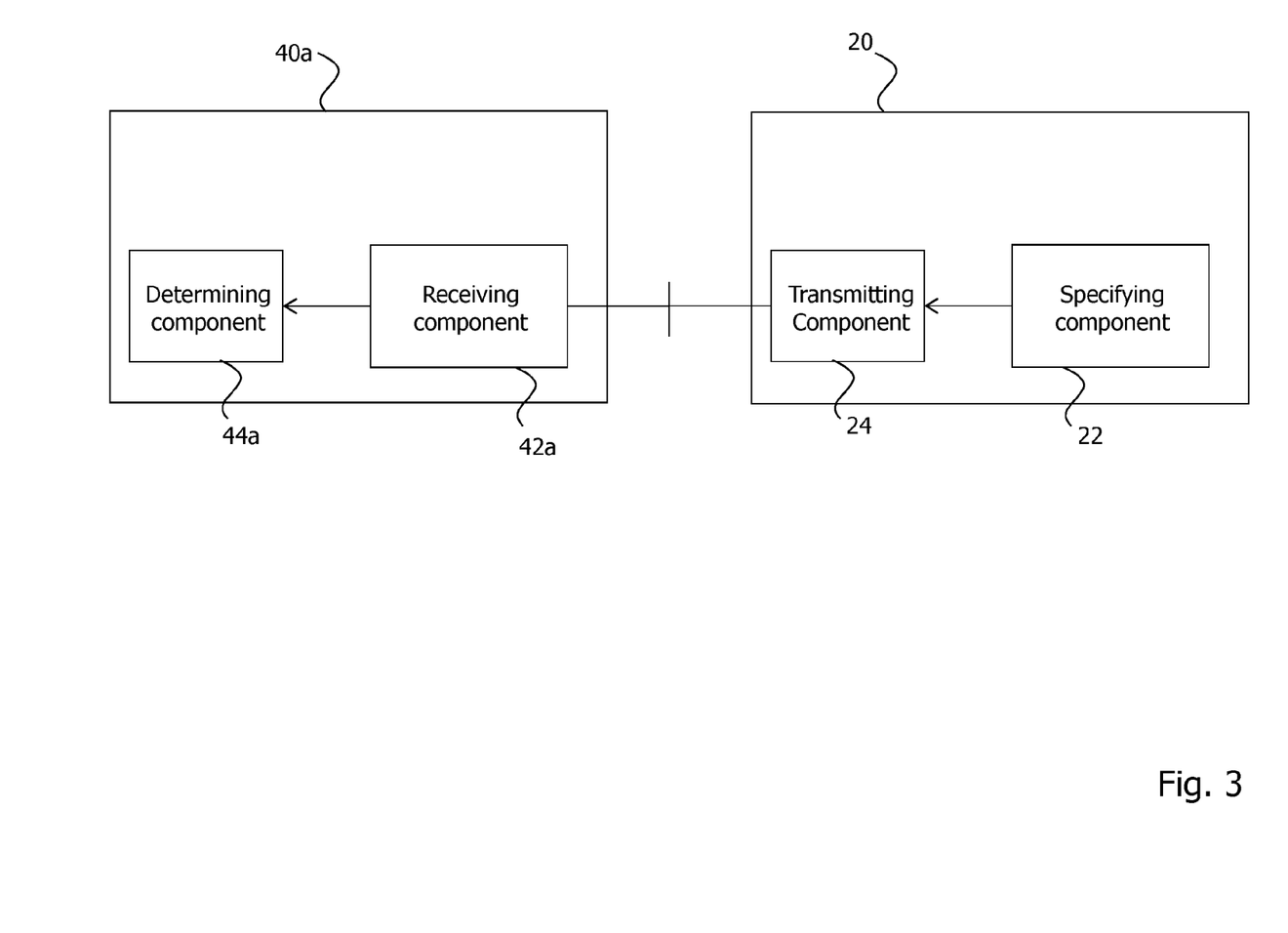
FIG. 3 is a schematic illustration of a content provider node and a PTM transmission control node according to an embodiment.

FIG. 3 shows further details of the MBM node 20 and the BM-SCs 40a to 40c of FIG. 2. Although only one of the BM-SCs 40a to 40c of FIG. 2 is illustrated in FIG. 3, the details set out below may equally also apply to the further BM-SCs 40b, 40c of FIG. 2. That is, at least a subset of the further BM-SCs 40b, 40c of FIG. 2 may also be implemented in the way as described with respect to BM-SC 40a.

The MBM node 20 comprises a specifying component 22 and a transmitting component 24. The BM-SC 40a comprises a receiving component 42a and a determining component 44a.

Figure 4:
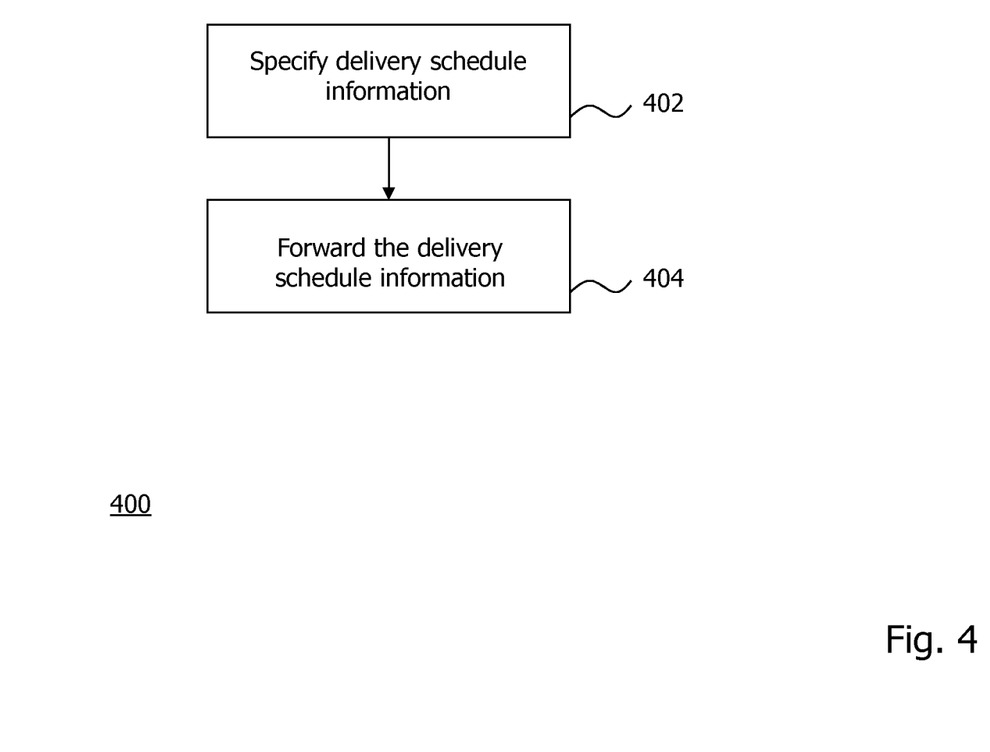
FIG. 4 is a flowchart illustrating a first method embodiment performed in the content provider node of FIG. 3.
Figure 5:
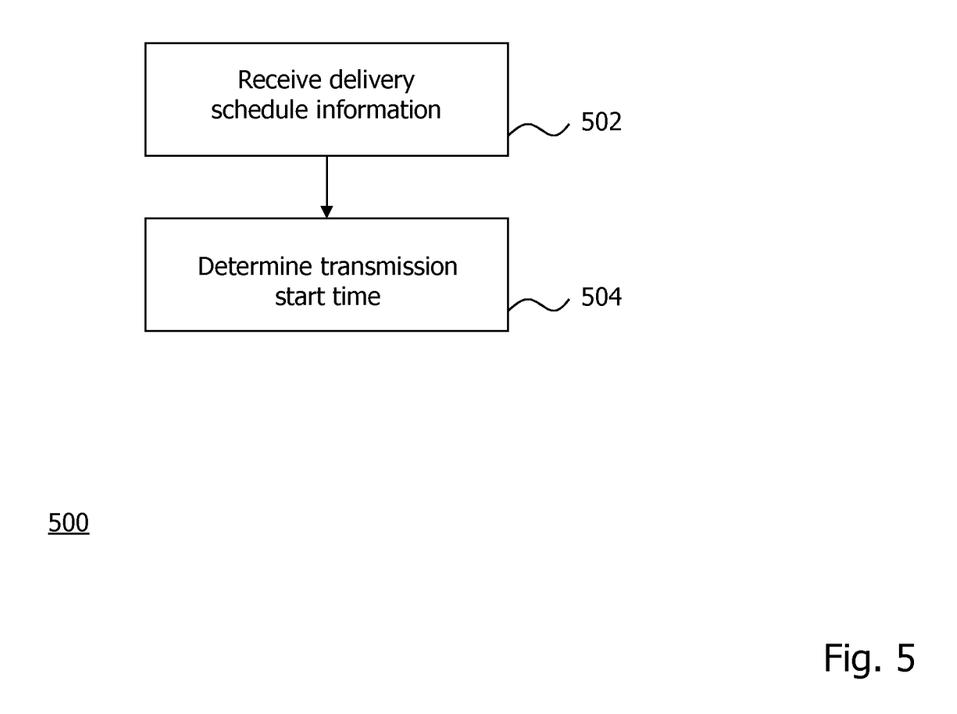
FIG. 5 is a flowchart illustrating a second method embodiment performed in the PTM transmission control node of FIG. 3.
Figure 6:
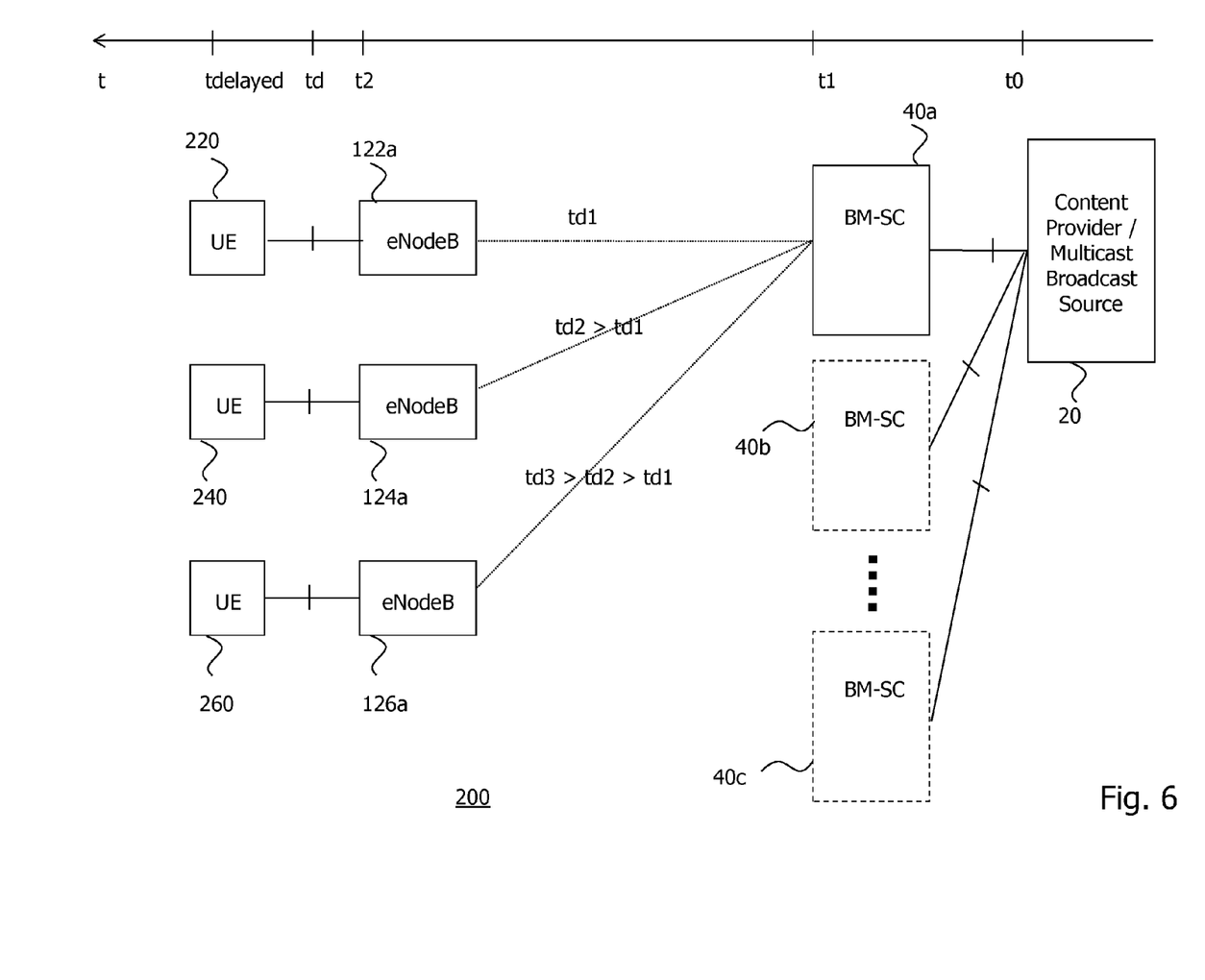
FIG. 6 is a schematic illustration of the operation of the MBMS system of FIG. 2.

The operation of the MBM node 20 and the BM-SC 40a will now be further explained with respect to FIGS. 4, 5 and 6. The illustration of FIG. 6 differs from the one of FIG. 2 in that FIG. 6 exemplarily illustrates multiple eNodeBs 122a, 124a, 126a as part of the e-UTRAN 120, which are respectively connected to a plurality of UEs 220, 240, 260 via an air interface. Each of the eNodeBs 122a, 124a, 126a is given in FIG. 3 to schematically illustrate one or more eNodeBs. That is, although only one eNodeB 122a is shown, the eNodeB 122a may likewise be replaced by multiple eNodeBs, e.g., a group of eNodeBs which serve a certain area and which transmit the content data in Single Frequency Network (SFN) operation mode. The same applies to the other eNodeBs 124a, 126a. Further, although only one UE 220 is shown, the UE 220 may be replaced by a plurality of UEs served by the eNodeB 122a. The same applies to the other UEs 240, 260.

The specifying component 22 of the MBM 20 is configured to specify delivery schedule information (step 402). The delivery schedule information indicates a delivery time td at which at least a portion of the content data is to be receivable by the plurality of UEs 220, 240, 260. In the following, it is by way of example, but without limitation, assumed that the delivery schedule information indicates a delivery time td at which a first packet of the content data is to be receivable by the plurality of UEs 220, 240, 260. In other words, the delivery time td is the time at which the first packet is available on the radio interface between the eNodeBs 122a, 124a, 126a and the UEs 220, 240, 260.

Alternatively, however, it may be possible that the delivery schedule information indicates a delivery time td at which a complete file containing the content data is to be receivable by the plurality of UEs 220, 240, 260.

The transmitting component 24 of the MBM 20 is configured to forward the delivery schedule information to the BM-SC 40a (step 404). In case of the architecture shown in FIG. 2, the transmitting component 24 is configured to forward the delivery schedule information also to the BM-SCs 40b and 40c. The transmitting component 24 may further be configured to transmit the delivery schedule information to the UEs 220, 240, 260. Alternatively or additionally, the BM-SC 40a may be configured to forward the delivery schedule information to the UEs 220, 240, 260.

The receiving component 42a of the BM-SCs 40a to 40c is configured to receive the delivery schedule information from the MBM 20 (step 502). The receiving component 42a may then forward the delivery schedule information to the determining component 44a. The determining component 44a of the BM-SCs 40a is configured to determine a transmission start time for starting the transmission of the content data to one or more of the plurality of mobile terminals located in a service area of the BM-SC 40a (step 504). Likewise, the determining components of the BM-SCs 40b and 40c are configured to determine a transmission start time for starting the transmission of the content data to one or more of the plurality of mobile terminals located in a service area of the BM-SCs 40b and 40c. The transmission start time is determined based on the delivery time as indicated by the delivery schedule information and one or more system delay parameters. The transmission start time may be determined at any time before transmission of the content data by the BM-SC 40a. For example, the transmission start time may be determined after receipt of the delivery schedule information or after receipt of the content data or at any time there between.

More specifically, the determining component 44a, for example, assumes that the MBM node 20 will provide the content data at time t0 in the future. Further, the determining component 44a derives from the delivery schedule information that the delivery time as scheduled by the MBM node 20 shall be td.

The BM-SC 40a knows its end-to-end delay to all of its serving areas, i.e. it knows the time delay until the first packet of the content data will be on air and thus receivable by the UEs 220, 240, 260. By way of example, it is assumed that the end-to-end delay from the BM-SC 40a until the first packet of the content data is receivable by the UE 220 (as provided by the eNodeB 122a) is the shortest delay td1, the end-to-end delay from the BM-SC 40a until the first packet of the content data is receivable by the UE 240 (as provided by the eNodeB 124a) is the second shortest delay td2 and the end-to-end delay from the BM-SC 40a until the first packet of the content data is receivable by the UE 260 (as provided by the eNodeB 126a) is the longest delay td3.

The BM-SC 4 of FIG. 1 would just forward the content data to the eNodeBs 122a, 124a, 126a in response to being triggered by the content provider 2. However, as the transmission delay td3 is the longest, the eNodeB 126a may not be able to prepare the content data in time. In other words, the eNodeB 126a may not be able to send out the first packet of the content data such that it is receivable at the delivery time td, but only at a later time, e.g., only at a time tdelayed the first packet may be receivable by the UE 260. In consequence, the UE 260 is waiting for the packets of the content data unnecessarily long and therefore wastes battery. For example, the first packet of the content data may be available on the air interface at a time tdelayed after the delivery time td. That is, the UE 260 wakes up at the delivery time td, but has to wait until the time tdelayed until it finally receives the first packet. The same may be true for the eNodeB 124a and the UE 240 and even for the eNodeB 122a and the UE 220, because the BM-SC 4 does also not take into account the (shorter) delay offsets td2 and td1, but is just being triggered by the content provider 2.

As described above, the BM-SC 40a (and likewise the BM-SCs 40b, 40c), however, considers the end-to-end delay to each of the eNodeBs 122a, 124a, 126a including the processing time needed by the eNodeBs 122a, 124a, 126a in order to provide the first packet of the content data on the radio interface. As the BM-SC 40a knows all end-to-end delays td1, td2, td3, it starts the sending of the content data to the eNodeBs 122a, 124a, 126a sufficiently early by considering not only the delivery time, but also the end-to-end delays. More precisely, the BM-SC schedules the transmission of the content data to the eNodeBs 122a, 124a, 126a such that the eNodeBs 122a, 124a, 126a have enough time to process all data packets for the MSP and to process the data packets such that they can finally be transmitted over the air interface.

Different implementations are conceivable for scheduling the transmission of the content data by the BM-SC 40a (and likewise by the BM-SCs 40b, 40c). According to a first possible implementation, the BM-SC 40a determines one single transmission time at which the content data is transmitted to all eNodeBs 122a, 124a, 126a (or eNodeB groups, in case the eNodeBs 122a, 124a, 126a illustrate eNodeB groups, respectively). This single transmission time may be determined by considering the longest end-to-end delay td3 between the BM-SC 40a and the eNodeBs 122a, 124a, 126a. According to a second possible implementation, the BM-SC 40a determines separate transmission times for each of the eNodeBs 122a, 124a, 126a (or eNodeB groups, in case the eNodeBs 122a, 124a, 126a illustrate eNodeB groups, respectively). Each of these separate transmission times is associated with one of the eNodeBs 122a, 124a, 126a and indicates the time at which the content data is transmitted to the respective one of the eNodeBs 122a, 124a, 126a. These separate transmission times may be determined by considering the respective end-to-end delays td1, td2, td3 between the BM-SC 40a and each of the eNodeBs 122a, 124a, 126a. In the present example, the separate transmission times are different from each other, but this is, of course, not mandatory. In the present example, because td3>td2>td1, the transmission time determined by the BM-SC 40a for transmission of the content data to the eNodeB 126a is earlier than the transmission time determined by the BM-SC 40a for transmission of the content data to the eNodeB 124a, which itself is earlier than the transmission time determined by the BM-SC 40a for transmission of the content data to the eNodeB 122a.

Independent of the exact implementation, the BM-SC 40a, more specifically, the determining component 44a determines the transmission start time of the content data, for example, such that after considering the longest end-to-end delay td3, even the NodeB 126a with the longest end-to-end delay to the BM-SC 40a has the content data ready for transmission before or at the latest at a time t2. The time t2 is set such that the first packet of the content data is on-air and thus receivable by the UEs 220, 240, 260 at the time td. One may say that the difference between the times td and t2 is the duration the respective eNodeB(s) need(s) for processing of the content data such that the content data is transmitted and on-air at time td.

When comparing the architectures of FIG. 1 on the one hand and the architecture of FIGS. 2, 3 and 6 on the other hand, the behavior of the BM-SC 40a (and also of the other BM-SCs 40b, 40c) is changed in comparison to the BM-SC 4 such that the MBM node 20 can instruct the BM-SC 40a to send a file to be received at a well-defined point in time. The BM-SC 40a knows exactly the end-to-end delay for its serving area(s) and by this can start sending the files sufficiently early so that the file is "on-air" (thus receivable) according to the instruction of the MBM node 20 and the schedule fragment information.

When comparing the content provider node 2 of FIG. 1 on the one hand and the MBM 20 of FIGS. 2, 3 and 6 on the other hand, the MBM node 20 is configured to define a delivery schedule for files at which the file shall be "on-air". In the example referred to with respect to FIGS. 2, 3 and 6, the delivery schedule is the time at which the first packet of the file is receivable for the UEs 220, 240, 260. Alternatively, the delivery schedule defines the time, at which the complete file including its potential FEC redundancy is completely sent over the radio interface. Thus, if many BM-SCs 40a to 40c with different transmission delays are involved in the broadcast transmission, then the MBM node 20 defines the target delivery time at which the file is delivered. The MBM node 20 can then inform all UEs 220, 240, 260 about the file delivery time.

Each BM-SC 40a to 40c knows the transmission delay offset, which is necessary for the SYNC protocol to work correctly. The transmission delay offset may be the transmission duration between the BM-SC 40a to 40c and the most remote eNodeB 126a in the serving area of the BM-SC 40a to 40c. Thus, each BM-SC 40a to 40c can know the transmission delay of a packet.

In short, the MBM node 20 is configured to describe the time, at which a file is receivable. Each BM-SC 40a to 40c determines the start of the transmission individually by using system specific parameters. The BM-SCs 40a to 40c may use the SYNC time line to precisely determine, when to send the data. The architecture of FIGS. 2, 3 and 6 allows the usage of the File Schedule method as defined in 3GPP correctly. The file delivery schedule may describe a start and stop time, at which the UE shall expect the reception of a file.

Another advantage of the architecture of FIGS. 2, 3 and 6 is that the MBM node 20 (provisioning node or content provider node) does not need to consider different transmission delays of the system for different vendors or differently configured broadcast areas.

It is believed that many advantages of the present invention will be fully understood from the foregoing description and it will be apparent that various changes may be made in the form, construction and arrangement of the exemplary aspects thereof without departing from the scope of the present invention or without sacrificing all of its advantages. For example, the variants and aspects described with respect to the first method embodiment equally apply to the second method embodiment. Likewise, the variants and aspects described with respect to the third method embodiment equally apply to the fourth method embodiment. Because the present invention can be varied in many ways, it will be recognized that the invention should be limited only by the scope of the following claims.

What is claimed is:

1. A method, in a PTM transmission control node, for scheduling a point-to-multipoint (PTM) transmission of content data, provided by a content provider node, to a plurality of mobile terminals in a PTM-enabled network, comprising:
    receiving an indication of a delivery time at which the content data is to be receivable by the plurality of mobile terminals on an air interface of the PTM-enabled network;
    obtaining one or more system delay parameters indicating one or more system delays, including indicating transmission delays between the PTM transmission control node and a radio access node to be used in the PTM transmission of the content data;
    determining a transmission start time for starting transmission of the content data from the PTM transmission control node to the radio access node, to account for the transmission delays and thereby enabling the radio access node to have the content data receivable on the air interface at the delivery time; and
    transmitting the content data towards the radio access node at the transmission start time.

2. The method of claim 1, wherein the radio access node is one of a plurality of radio access nodes to be used for the PTM transmission of the content data, and wherein the method comprises determining a respective transmission start time with respect to each radio access node among the plurality of radio access nodes, based on the transmission delays indicated by the one or more system delay parameters for the radio access node, and transmitting the content data towards any particular one of the radio access nodes among the plurality of radio access nodes at the transmission start time determined for that particular radio access node.

3. The method of claim 1, wherein the radio access node is one of a plurality of radio access nodes to be used for the PTM transmission of the content data, and wherein the method comprises determining one transmission start time to be used in common for the plurality of radio access nodes, and accounting for a longest transmission delay among the transmission delays indicated by the one or more system delay parameters for respective ones of the radio access nodes among the plurality of radio access nodes.

4. The method of claim 3, wherein the longest transmission delay corresponds to the duration for transmitting the content data from the PTM transmission control node to the most remote radio access node of the plurality of radio access nodes in the service area of the PTM transmission control node.

5. The method of claim 1, wherein the one or more system delay parameters further indicate processing delays at the radio access node associated with preparing the content data for transmission on the air interface at the delivery time, and wherein the method comprises accounting for the processing delays when determining the transmission start time.

6. The method of claim 1, wherein the one or more system delay parameters further indicate at least one of the following additional delays:
- delays between the content provider node and the PTM transmission control node;
- delays associated with transmitting the content data in Multicast CHannel (MCH) Scheduling Periods (MSPs); and
- delays associated with segmentation of the content data; and
- wherein the method comprises accounting for any one or more of the additional delays when determining the transmission start time.

7. The method of claim 1, wherein the one or more system delay parameters further indicate at least one of the following additional delays: information indicating the amount of the content data to be transmitted, and information indicating the target bitrate for the transmission of the content data, and wherein the determining component is configured to account for any one or more of the additional delays when determining the transmission start time.

8. The method of claim 1, wherein the delivery time is the time at which the first packet of the content data is to be receivable by the plurality of mobile terminals.

9. The method of claim 1, wherein the delivery time is the time at which a certain amount of the content data is to be receivable by the plurality of mobile terminals or the delivery time is the time at which a certain amount of the content data and additional Forward Error Control (FEC) data is to be receivable by the plurality of mobile terminals.

10. The method of claim 1, wherein the content data is arranged in a data file, and wherein the delivery time is the time at which the transmission of the data file over the air interface to the plurality of mobile terminals is to be completed or the time at which the transmission of the data file together with additional Forward Error Control (FEC) data over the air interface to the plurality of mobile terminals is to be completed.

11. The method of claim 1, further comprising receiving a delivery start time and a delivery stop time during which the content data is to be receivable by the plurality of mobile terminals, and wherein determining the transmission start time comprises determining the transmission start time based in part on the delivery start time and the delivery stop time.

12. A point-to-multipoint (PTM) transmission control node for scheduling a PTM transmission of content data, provided by a content provider node, to a plurality of mobile terminals in a PTM-enabled network, comprising:
- a receiving component configured to receive an indication of a delivery time at which the content data is to be receivable by the plurality of mobile terminals on an air interface of the PTM-enabled network;
- a determining component configured to:
  - obtain one or more system delay parameters indicating one or more system delays, including indicating transmission delays between the PTM transmission control node and a radio access node to be used in the PTM transmission of the content data; and
  - determine a transmission start time for starting transmission of the content data from the PTM transmission control node to the radio access node, to account for the transmission delays and thereby enabling the radio access node to have the content data receivable on the air interface at the delivery time; and
- a transmitting component configured to transmit the content data towards the radio access node at the transmission start time.

13. The PTM transmission control node of claim 12, wherein the radio access node is one of a plurality of radio access nodes to be used for the PTM transmission of the content data, and wherein the determining component is configured to determine a respective transmission start time with respect to each radio access node among the plurality of radio access nodes, based on the transmission delays indicated by the one or more system delay parameters for the radio access node, and wherein the transmitting component is configured to transmit the content data towards any particular one of the radio access nodes among the plurality of radio access nodes at the transmission start time determined for that particular radio access node.

14. The PTM transmission control node of claim 12, wherein the radio access node is one of a plurality of radio access nodes to be used for the PTM transmission of the content data, and wherein the determining component is configured to determine one transmission start time to be used in common for the plurality of radio access nodes, and account for a longest transmission delay among the transmission delays indicated by the one or more system delay parameters for respective ones of the radio access nodes among the plurality of radio access nodes.

15. The PTM transmission control node of claim 12, wherein the one or more system delay parameters further indicate processing delays at the radio access node associated with preparing the content data for transmission on the air interface at the delivery time, and wherein the determining component is configured to account for the processing delays when determining the transmission start time.

16. The PTM transmission control node of claim 12, wherein the one or more system delay parameters further indicate at least one of the following additional delays:
- delays between the content provider node and the PTM transmission control node;
- delays associated with transmitting the content data in Multicast CHannel (MCH) Scheduling Periods (MSPs); and
- delays associated with segmentation of the content data; and
- wherein the determining component is configured to account for any one or more of the additional delays when determining the transmission start time.

* * * * *